No. 639,399. Patented Dec. 19, 1899.
E. KEMPSHALL.
CUSHIONED PNEUMATIC VEHICLE TIRE.
(Application filed Nov. 27, 1899.)
(No Model.)
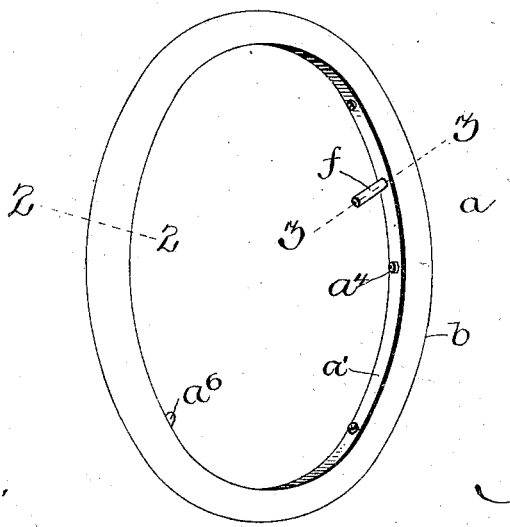
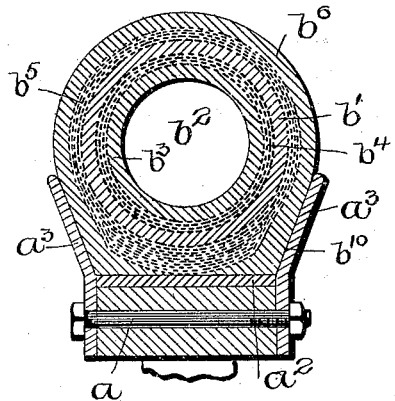
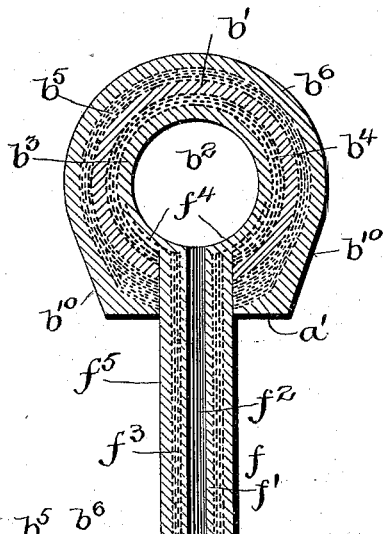
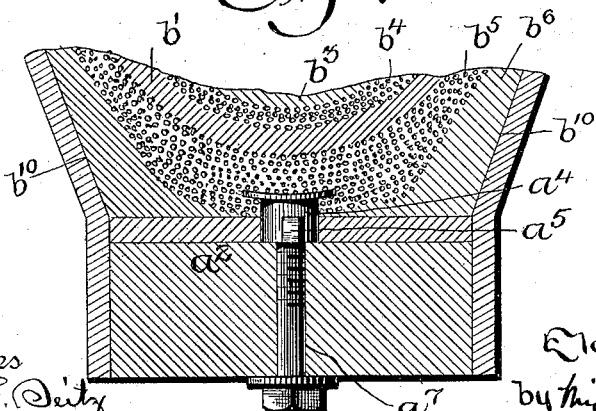
Witnesses
Horace G. Seitz
A. W. Harrison
Inventor
Eleazer Kempshall,
by Wright Brown Quinby
his Attorneys.

UNITED STATES PATENT OFFICE.

ELEAZER KEMPSHALL, OF NEWTON, MASSACHUSETTS, ASSIGNOR TO THE RUBBER TIRE COMPANY OF AMERICA, OF NEW YORK, N. Y.

CUSHIONED PNEUMATIC VEHICLE-TIRE.

SPECIFICATION forming part of Letters Patent No. 639,399, dated December 19, 1899.

Application filed November 27, 1899. Serial No. 738,427. (No model.)

*To all whom it may concern:*

Be it known that I, ELEAZER KEMPSHALL, of Newton, in the county of Middlesex and State of Massachusetts, have invented certain new and useful Improvements in Cushioned Pneumatic Vehicle-Tires, of which the following is a specification.

This invention has for its object the production of a cushioned pneumatic tire; and it consists in the novel features of construction and relative arrangement of parts hereinafter fully described in the specification, clearly illustrated in the drawings, and particularly pointed out in the claims.

Figure 1 represents a perspective view showing my cushioned pneumatic tire. Fig. 2 represents a cross-section of the tire on the line 2 2 of Fig. 1. Fig. 3 represents a cross-section of the tire on the line 3 3 of Fig. 1. Fig. 4 is a detail cross-sectional view of a portion of the tire, on an enlarged scale, showing the location and arrangement of the ends of the plies composing the fabric tubes and the manner of securing the tire in place on a wheel-rim.

Referring to the drawings, $a$ represents a cushioned pneumatic tire constructed in accordance with my invention. As shown, the tire has a general oval shape and a flat inner face $a'$ to bear upon the complemental flat face of a rim $a^2$ of a wheel. Any force tending to give said tire a sidewise movement is opposed by plates or flanges $a^3$ upon said rim and the said opposing faces of the tire and the rim. The broad flat bearing-surfaces of the tire and rim serve to maintain the tire in position and also serve as lever-arms, through which the tire works to resist a sidewise force tending to rock the tire. This construction of the inner face of the tire, together with the flanges, serves not only to maintain the tire on the rim in proper position, but to keep the tire from being rocked out of position by the heavy strains or blows to which vehicle-tires are subjected.

Lugs $a^4$, having ribs $a^5$, are built into the inner wall of the tire and protrude out of the inner flat faces of the tire, as shown in Figs. 1 and 4. The wheel-rim is formed with openings to receive the lug and its rib. Bolts are passed through the rim into the lugs in order to more firmly bind the tire to the wheel-rim when additional means of this sort are desired. The rib on the lug by its engagement with a complemental recess in the rim serves to keep the lug from being twisted in the tire by the bolt. In place of these lugs I may use rubber ribs projecting from the inner face of the tire and resting in complemental grooves in the face of the wheel-rim. I have shown one such rib at $a^6$ in Fig. 1, the number of ribs or lugs being a matter of degree and not requiring further illustration.

While I have shown a tire having a flat inner face, I do not wish to be understood as limiting my invention to such a form of my cushioned pneumatic tire, since the tire may be made, and for some uses would be made, round in cross-section and without any flat inner face. The flat-inner-face form I prefer for the reason that the flat face aids in keeping the tire in place upon the wheel, and in this form the several joints and wrappings of the fabric can be applied on the flat-faced side of the tire, where they are subjected to a less degree of stress and strains than the balance of the tire is subjected to, as will be evident by an inspection of Figs. 2, 3, and 4, the inside base of the tire resting in and being held by a form composed of the rim $a^2$ and flanges $a^3$ of the wheel.

The tire is preferably provided with oppositely inclined or beveled side faces $b^{10}$ $b^{10}$ between the inner flat face $a'$ and the outer or tread face, said side faces giving the cross-section of the tire a wedge shape. The inner portions of the tubes of reinforcing fabric $b^4$ and $b^5$, hereinafter described, are between the inclined sides $b^{10}$, giving the wedge-shaped inner portion of the tire stability and lessening its tendency to tip or roll laterally out from between the flanges $a^3$ $a^3$ of the wheel-rim. This wedge form of the tire is very desirable, because it gives the tire a firm frictional bearing on the flanges $a^3$ $a^3$, the wedge portion being more or less compressed when its inclined sides are seated on the correspondingly-inclined sides of the flanges $a^3$.

Referring to Figs. 1, 2, 3, and 4, my cushioned tire, as shown, consists of an endless tube and a valve-stem $f$, formed as parts of one unitary integral structure, the walls forming the air-chamber of the tube being continued to form the walls of the air-passage of the valve-stem. The tube and valve-stem are each what are termed "built-up" structures that are made by superimposed multiple layers of required material instead of being built up of one layer, whereby the strength and durability and efficiency of the structure are largely increased.

The tire is composed of an inner member, an outer member, and a cushion-tube of rubber, which acts as a cushion to the tire. While other compounds of rubber and sulfur may be employed for this purpose, yet in practice I have found that sponge-rubber gives better results in that it not only yields inwardly, but also laterally, thereby cushioning the effect of blows upon the tire as well as the effect of strains due to pressure. I desire it understood, however, that I do not limit myself to sponge-rubber as the material of the tube $b'$. The said tube $b'$ or cushion is proportioned so that it absorbs the lateral and longitudinal movements of the tread portion of the tire—that is to say, the cushion is so thick and substantial that there is sufficient elastic material between its inner and outer surfaces to yield or stretch under strain exerted on the tread, thus taking up and absorbing movements of the tread and reducing liability of the tearing apart of the several layers. The cushion $b'$ also constitutes an elliptic spring in the compressed portion of the tire between the wheel-rim and the pavement, which adds materially to the efficiency of the tire in preventing contact between the rim-flanges and the pavement in the event of the deflation of the air-chamber in a pneumatic tire.

The air-chamber $b^2$ is formed by a layer of rubber $b^3$, backed by a multiple-ply reinforcing-tube of fabric $b^4$, (here shown as consisting of five plies,) although the number may be varied, depending upon the strength of the material employed. The parts $b^3 b^4$ form together the air-tube of the tire, the fabric backing serving to protect the air-tube against injury from without and also serving to limit the extent to which the tube can be pushed outwardly at any point by pressure. Preferably the air-chamber in my cushioned pneumatic tire is relatively small in diameter—in ordinary cases in the vicinity of an inch. This reduces as far as practicable the element of defect in the wall of the air-tube, and by means of the built-up construction of the backing $b^4$ the rubber tube $b^3$ is forced by the pressure of air to a uniform cylinder—to wit, the inner wall of the fabric backing $b^4$—thus avoiding the condition of affairs that has frequently produced the bursting of the air-tubes in tires prior to my invention—that is to say, when an air-tube is not provided with a fabric backing and a weak spot exists in the rubber of the air-tube when pressure is applied it forces this weak spot in the rubber out and the pressure concentrates at this point, bursting the air-chamber.

The cushion $b'$, as shown, is arranged about the fabric backing $b^4$.

$b^5$ represents a multiple-ply tube of reinforcing fabric arranged about and secured to the cushion $b'$. The number of plies composing the tube $b^5$ will depend upon the strength and thickness of the material employed. Splices of the several fabric tubes are made on the inner side of the tire, and some short pieces (see Fig. 4) of fabric are inserted in the outer tube $b^5$ in order to fill out the tube on the inside in a flat form.

$b^6$ represents a facing or tube of rubber applied and secured to the fabric tube $b^5$.

The precise form given the tire is obtained by means of the faces of the mold.

The valve-stem $f$ is composed of a core $f'$, which forms a continuation of the tube $b^3$, as shown. The core $f'$ is formed with an air-passage $f^2$, which forms a continuation of the air-chamber $b^2$ of the tire. Surrounding and secured to the core $f'$ is a multiple-ply tube of fabric $f^3$, certain plies of this tube being extended, as at $f^4$, into and anchored to the interior of the tube $b^3$, (see Fig. 3,) in order to more securely bind the several parts of the tires together.

$f^5$ represents a facing of rubber surrounding and connected to the fabric backing $f^3$, said facing of rubber forming a continuation of the several layers of rubber comprising the tube.

In practice the tire and tube are built up together out of green stock and vulcanized into one unitary integral structure. The tire is protected from puncture by a double fabric tube, and the required resiliency is given the tire by means of the rubber cushion and the inner member. The cushion $b'$ further serves to allow movement of the outer and inner members in opposite directions laterally as well as longitudinally, produced by pressure on the tire when in use.

The valve-stem, it will be seen, is firmly anchored to the air-tube and is an integral part of the same, and the air-passage of the valve-stem is protected by a fabric backing, the wall of said air-passage forming an integral extension of the tube $b^3$, which forms the wall of the air-chamber $b^2$ of the tire. Furthermore, the fabric $f^3$ of the stem is so embedded in and anchored to the structure of the tube that any pull upon the stem is resisted by the fabric, and the core or wall $f'$ of the air-passage $f^2$ is relieved from strain and protected from injury.

The valve-stem passes through and is closely surrounded by the fabric backings $b^4$ $b^5$ and the intermediate cushion, and its adhesion to said parts adds materially to the strength of the connection of the valve-stem to the tire.

The fabric employed in making my described tire consists of cotton or other strong fabric treated with rubber in the usual way. The several plies of fabric and the tubes of rubber being arranged as shown and vulcanized, the rubber of the fabric and of the tubes unites. The particular arrangement of the plies may be variously modified without departing from the spirit and scope of my invention, which includes a cushioned pneumatic tire—that is to say, a tire having a cushion-tube of sponge-rubber or equivalent material interposed between and connected to the inner member or air-chamber of the tire and the outer member or wear-cover of the tire.

The tire is put on the rim by first deflating said tire, removing the nut on the end of the bolt $a^7$, which ties the side plates $a^3$ to the rim, taking off one of said side plates, then placing the tire on the rim and bolting its lugs to the rim, and then replacing the side plate.

While my invention is particularly adapted for pneumatic tires, yet I do not wish to be understood as limiting my invention to such form, since it may be embraced in and cover other forms of tires where the central space or member is filled more or less completely with rubber or other material instead of air. Since in both forms—that is, the form in which there is an air-chamber and the form in which there is no air-chamber—so far as the fabric tubes are concerned, each form is composed of an inner yielding member having a fabric backing, an outer wear member supported on the fabric backing, and a resilient cushion-tube arranged between and connected to the inner and outer members.

It will be seen that I have provided a cushioned tire comprising an inner yielding member adapted to absorb radial inward movements of the tread portion and backed by a tube of reinforcing fabric, an outer envelop also backed by a tube of reinforcing fabric which is separate from the first-mentioned tube, and an intermediate motion-absorbing tubular rubber cushion interposed between said reinforcing fabric tubes and vulcanized thereto. I am enabled by this combination to give each of the three general parts of the tire characteristics particularly fitting it for the function it is to perform and at the same time insure durability and freedom from liability of the ripping apart or the separation of said parts. The longitudinal and lateral movements of the tread portion of the tire will be absorbed by the said tubular cushion or imparted, considerably reduced, through the cushion to the inner yielding member.

I believe it to be new to combine in a cushioned vehicle-tire three general parts—viz., an inner yielding member backed by a reinforcing fabric, an outer envelop backed by a reinforcing fabric, and an intermediate motion-absorbing tubular rubber cushion interposed between said reinforcing fabrics and vulcanized thereto.

Having thus explained the nature of my invention, and described a way of constructing and using the same, though without attempting to set forth all of the forms in which it may be made or of all the modes of its use, what I claim, and desire to secure by Letters Patent, is—

1. A cushioned vehicle-tire comprising an inner yielding member backed by a tube of reinforcing fabric, an outer envelop backed by a separate tube of reinforcing fabric, and an intermediate motion-absorbing rubber cushion interposed between said reinforcing fabrics, said parts being vulcanized together.

2. A cushioned vehicle-tire comprising an inner yielding member, and a series of surrounding layers vulcanized together and including a backing of reinforcing fabric surrounding the inner yielding member, a motion-absorbing cushion surrounding said backing, a backing of reinforcing fabric surrounding the said cushion, and an outer facing of rubber.

3. A cushioned vehicle-tire comprising an inner tube of rubber, a backing of reinforcing fabric surrounding the same, a motion-absorbing cushion surrounding said backing, a backing of reinforcing fabric surrounding the said cushion, and an outer facing of rubber, said parts being vulcanized together.

4. A cushioned vehicle-tire comprising an inner yielding member backed by a reinforcing fabric, an outer envelop backed by a reinforcing fabric, and having an outer tread-face and a substantially flat inner face, and an intermediate motion-absorbing cushion interposed between and united with said reinforcing fabrics.

5. A cushioned three-part vehicle-tire comprising an inner yielding member backed by a reinforcing fabric, an outer envelop backed by a reinforcing fabric and having an outer tread-face, a substantially flat inner face, and oppositely inclined or beveled sides between the inner and outer faces said sides imparting a wedge form to the cross-section of the tire, and an intermediate motion-absorbing cushion interposed between and united with said reinforcing fabrics, the said reinforcing fabrics extending inwardly between the beveled sides of the tire.

6. A cushioned vehicle-tire comprising an inner yielding air-chamber backed by a reinforcing fabric, an outer envelop backed by a reinforcing fabric, an intermediate motion-absorbing cushion interposed between the said reinforcing fabrics, and a valve-stem formed as an integral extension of the walls of the air-chamber and extending through the said cushion and reinforcing fabrics.

7. A cushioned vehicle-tire comprising an inner yielding air-chamber backed by a reinforcing fabric, an outer envelop backed by a reinforcing fabric, an intermediate motion-absorbing cushion interposed between the said reinforcing fabrics, a valve-stem comprising a core of rubber formed as an integral extension of the walls of the air-chamber and having an air-passage, a multiple tube of fabric surrounding and connected to said core, portions of said tube being extended and anchored in the wall of the air-chamber, and a rubber facing surrounding and connected to said tube and formed also as an integral extension of the wall of the air-chamber, the said valve-stem extending through and being closely embraced by the said cushion and reinforcing fabrics.

8. A cushioned vehicle-tire, comprising an inner yielding member backed by multiple-ply tubes of fabric, an outer envelop backed by multiple-ply tubes of fabric, and a motion-absorbing cushion arranged between and connected to the inner and outer fabric tubes, the laps and joints of said plies of fabric being arranged in the inner side of the tube.

9. A cushioned pneumatic vehicle-tire comprising a relatively small air-chamber formed by a relatively thick tube of rubber and surrounded and backed by a tube of reinforcing fabric, an outer inclosing envelop composed of a rubber facing connected to and supported by a separate tube of reinforcing fabric, and an elastic motion-absorbing rubber cushion interposed between said reinforcing-tubes and vulcanized thereto.

In testimony whereof I have affixed my signature in presence of two witnesses.

ELEAZER KEMPSHALL.

Witnesses:
 WILLIAM QUINBY,
 A. W. HARRISON.